United States Patent
Arnaud et al.

(10) Patent No.: US 10,256,900 B2
(45) Date of Patent: Apr. 9, 2019

(54) MULTI-ANTENNA GROUND STATION FOR IMPLEMENTING A SEAMLESS HANDOVER WITH DIVERSITY FROM AN ORIGIN MOVING SATELLITE TO A DESTINATION MOVING SATELLITE, AND CORRESPONDING HANDOVER METHOD

(71) Applicant: THALES, Courbevoie (FR)

(72) Inventors: Mathieu Arnaud, Toulouse (FR); Jean-François Boutillon, Toulouse (FR); Jean-Luc Almeida, Toulouse (FR)

(73) Assignee: THALES, Courbevoie (FR)

(*) Notice: Subject to any disclaimer, the term of this patent is extended or adjusted under 35 U.S.C. 154(b) by 0 days.

(21) Appl. No.: 15/973,315

(22) Filed: May 7, 2018

(65) Prior Publication Data
US 2018/0337723 A1    Nov. 22, 2018

(30) Foreign Application Priority Data
May 16, 2017 (FR) .................................... 17 00518

(51) Int. Cl.
*H04B 7/185* (2006.01)
*H01Q 1/24* (2006.01)
(Continued)

(52) U.S. Cl.
CPC ......... *H04B 7/18517* (2013.01); *H01Q 1/246* (2013.01); *H04B 7/0404* (2013.01);
(Continued)

(58) Field of Classification Search
CPC ............ H04B 7/18513; H04B 7/18515; H04B 7/18508; H04B 7/04; H04B 7/18519;
(Continued)

(56) References Cited

U.S. PATENT DOCUMENTS

| | | | |
|---|---|---|---|
| 2007/0086255 A1 | 4/2007 | Lin et al. | |
| 2007/0135040 A1* | 6/2007 | Draim | H04B 7/18541 455/12.1 |

(Continued)

FOREIGN PATENT DOCUMENTS

EP    2 779 482 A1    9/2014

*Primary Examiner* — Keith Ferguson
(74) *Attorney, Agent, or Firm* — Baker & Hostetler LLP

(57) ABSTRACT

A ground station with P antennas for individually tracking a satellite out of an origin first moving satellite S1 and a destination second moving satellite S2 comprises, connected in series, a multi-channel reception and processing device and a combination device with configurable diversity, and comprises a device for managing diversity and seamless handover of a reception communication link from the origin first satellite S1 to the destination second satellite S2. The diversity and seamless handover management device is configured to manage and coordinate the execution of a succession of k seamless and unitary antenna handovers Bi, and during each seamless and unitary handover Bi, control the antennas, the multi-channel reception and processing device and the combination device with configurable diversity by determining and sending to them respectively: satellite acquisition pointing commands, and commands for alignment in time and in phase of the P signals received as input of the multi-channel reception and processing device generated as a function of measurements of time and phase deviations of P-1 signals received as input in relation to the signal received as input taken as reference signal, and a setpoint for selection of the output processed signals to be combined as a function of the scheduling of the handover from the first diversity configuration C1 to the second diversity configuration C2 and as a function of measurements of qualities of the signals received as input of the reception and processing device.

16 Claims, 8 Drawing Sheets

(51) Int. Cl.
*H04B 7/0404* (2017.01)
*H04W 36/18* (2009.01)

(52) U.S. Cl.
CPC ..... *H04B 7/18515* (2013.01); *H04B 7/18534* (2013.01); *H04B 7/18541* (2013.01); *H04W 36/18* (2013.01)

(58) Field of Classification Search
CPC .............. H04B 7/1851; H04B 7/18517; H04B 7/18521; H04B 7/18541; H04B 7/212
See application file for complete search history.

(56) References Cited

U.S. PATENT DOCUMENTS

| | | |
|---|---|---|
| 2016/0278033 A1 | 9/2016 | Wu et al. |
| 2017/0105153 A1 | 4/2017 | Ashrafi et al. |

\* cited by examiner

MULTI-ANTENNA GROUND STATION FOR IMPLEMENTING A SEAMLESS HANDOVER WITH DIVERSITY FROM AN ORIGIN MOVING SATELLITE TO A DESTINATION MOVING SATELLITE, AND CORRESPONDING HANDOVER METHOD

CROSS-REFERENCE TO RELATED APPLICATIONS

This application claims priority to foreign French patent application No. FR 1700518, filed on May 16, 2017, the disclosure of which is incorporated by reference in its entirety.

FIELD OF THE INVENTION

The present invention relates to a multi-antenna ground station, accessing a constellation of moving telecommunication satellites, and capable of implementing a seamless handover with diversity of a communication link from an origin satellite to a destination satellite, and a corresponding handover method.

BACKGROUND

On satellite telecommunication systems using a constellation of satellites moving in orbits of HEO (High Earth Orbit) or MEO (Medium Earth Orbit) or LEO (Low Earth Orbit) type, and fixed or mobile ground stations forming terminals of the satellite access system, the use of at least two antennas is required to allow a handover of the communication link ensuring the service supplied to the ground station from an origin first descending satellite at end of line of sight to a destination second ascending satellite at the start of line of sight, when the antennas of the ground stations are directional.

Hitherto, the multi-antenna ground stations, whether manufactured or which have been proposed, comprise two antennas and use just one of them throughout the period separating two consecutive handovers. Moreover, during the implementation of a handover, these ground stations require a dual demodulation chain.

Recently, ground stations have been developed which make it possible to couple, between two link handovers, the reception of a same carrier from a same satellite targeted by the two antennas, and to thus produce a reception diversity on the two antennas.

The patent application EP 2 779 482 A1 describes the architecture of such a ground station with two antennas which make it possible to process in diversity only the signal received from two antennas originating from a same satellite.

The architecture described in the abovementioned document, and the architectures of the ground stations produced and in service to date, do not make it possible to produce a seamless link handover between two satellites during which a reception diversity on at least two antennas targeted on the two satellites can be used to reinforce the quality and the reliability of the handover. Nor do these architectures allow for an uninterrupted use of a multi-antenna reception diversity during a link handover between two origin and destination reception diversity configurations of antennas pointing exclusively to the first satellite for the origin configuration and to the second satellite for the destination configuration. Nor do these architectures have the modularity required that allows an addition as and when necessary of a new antenna to improve the reception performance levels.

A first technical problem is to propose a ground station architecture having at least two mobile direction antennas which improves the seam lessness of a link handover between a first satellite and a second satellite.

A second technical problem is to propose a ground station architecture that makes it possible to perform, during the reception link handover, a reception diversity on at least two antennas, one pointing to the first satellite and another pointing to the second satellite.

A third technical problem is to propose a ground station architecture which allows for an uninterrupted use of a multi-antenna reception diversity during a link handover between two origin and destination reception diversity configurations of antennas pointing exclusively to the first satellite for the origin configuration and pointing exclusively to the second satellite for the destination configuration.

A fourth technical problem is to propose a modular architecture which allows for an addition as and when required of a new antenna to improve the reception performance levels.

A fifth technical problem is to propose a multi-antenna ground station architecture, solving at least one of the first, second, third and fourth technical problems, which makes it possible, when there is a plurality of at least two antennas pointing to a same satellite, to send to said satellite a plurality of carriers carrying a communication signal that are identical, said carriers being adapted in transmission to supply, in reception from the satellite, a wave front of the carriers that is aggregated coherently.

SUMMARY OF THE INVENTION

To this end, the subject of the invention is a multi-antenna ground station of a satellite telecommunications system using a constellation of moving satellites. The ground station comprises:

an integer number P, greater than or equal to two, of antennas capable in reception of each tracking, for a same predetermined time period, a satellite taken from an origin first satellite S1 and a destination second satellite S2, both in line of sight during said period, a multi-channel reception and processing device, with P input terminals, connected respectively to P output terminals of the P antennas, to receive as input of said reception and processing device P antenna signals received and supplied as output of said reception antennas, and to P output terminals to deliver in parallel P output processed signals, aligned with one another in time and in phase, obtained respectively from the P antenna signals received, and a combination device with configurable diversity, connected as input to the multi-channel reception and processing device, to combine some or all of the output processed signals as a function of a setpoint of selection of the output processed signals to be combined, and a device for managing diversity and seamless handover of a reception communication link from the origin first satellite Si to the destination second satellite S2.

The ground station is characterized in that the diversity and seamless handover management device is configured to:

manage and coordinate the execution of a handover of the communication link from the origin first satellite S1 to the destination second satellite S2, said handover of the communication link consisting of a succession of a number k, greater than or equal to 2, of seamless and unitary antenna handovers Bi, selected according to a predetermined sequence, each seamless and unitary handover of antennas Bi being a handover of an antenna from a first operational configuration of diversity in reception $C1(i)$ in which the selected antenna is pointed with tracking to the first satellite S1, to a second operational configuration of diversity in reception $C2(i)$ in which the selected antenna is pointed with tracking to the second satellite S2, at least one of the first and second configurations $C1(i)$, $C2(i)$ of diversity in reception being a configuration in which the diversity in reception is implemented on both the first and second satellites S1, S2, and during each seamless and unitary handover Bi (32, 34; 84, 86, 88), controlling the antennas, the multi-channel reception and processing device and the combination device with configurable diversity by determining and sending to them respectively:

satellite acquisition pointing commands, and commands aligning in time and in phase the P signals received as input of the multi-channel reception and processing device generated as a function of measurements of time and phase deviations of P-1 signals received as input in relation to the signal received as input taken as reference signal, and a setpoint for selecting the output processed signals to be combined as a function of the scheduling of the handover from the first diversity configuration $C1(i)$ to the second diversity configuration $C2(i)$ and as a function of measurements of qualities of the signals received as input of the reception and processing device.

According to particular embodiments, the multi-antenna ground station comprises one or more of the following features:

the integer number P of reception antennas, each capable of pointing to and tracking, for a same predetermined time period, a satellite taken from a first satellite S1 and a second satellite S2, and of channels of the reception and processing device is greater than or equal to three, and preferably equal to three, and the first and second configurations $C1(i)$, $C2(i)$ of diversity in reception of each unitary seamless handover Bi are each configurations in which the diversity in reception is implemented on both first and second satellites S1, S2, and during each unitary seamless handover Bi and during the handover of the communication link, a diversity in reception on at least two antennas is permanently assured;

the multi-channel reception and processing device is configured to:

receive, standardize and filter on P distinct and separate channels, the P received antenna signals supplied as output by the P antennas into P standardized and filtered signals, then estimate time deviations, phase deviations and quality deviations between a reference standardized and filtered signal, taken from the P standardized and filtered signals, and the P-1 remaining standardized and filtered signals, and supply said deviations to the diversity and handover management device; then for each channel, apply a time compensation and a phase compensation to the filtered signal associated with the channel from the corresponding time and phase alignment commands, generated and sent by the diversity and handover management device;

the multi-channel reception and processing device further comprises a battery of P automatic gain control AGC devices for standardizing the signals received as input of the multi-channel reception and processing device, and a battery of P band pass filters for filtering the standardized signals, for example SRRC filters;

the multi-channel reception and processing device further comprises a battery of P-1 complex cross-correlators for estimating time deviations, phase deviations and quality deviations between a reference standardized and filtered signal, taken from the P standardized and filtered signals, and the P-1 remaining standardized and filtered signals, and supplying said deviations to the management and handover device, by seeking, for each cross-correlator, a correlation peak which makes it possible to deduce the time deviation between the compared signals, by exploiting the argument of the cross-correlated signal to determine the phase deviation between the compared signals, and by exploiting the level of correlation between the compared signals to determine a quality difference indication;

the multi-channel reception and processing device further comprises a battery of P delay lines FIFOs with programmable time offset, connected downstream to a battery of multipliers with programmable phase compensation, the multipliers allowing the phase compensations being connected as input to the combination device with diversity;

the multi-channel reception and processing device is configured to selectively adjust the gain of each of the channels so as to be able to progressively attenuate the output level of the output signal in search for an output chain that is to be removed from the combination with diversity, and the diversity and handover management device is configured, upon a handover of antenna from the first satellite to the second satellite, to order a degressive gain ramp on the chain to be removed by the combination device with diversity, and when the differential quality has exceeded a predetermined threshold, order the combination device with diversity to remove said chain;

the multi-antenna ground station comprises a demodulator connected at the output of the combination device with diversity and a device for implementing an adaptive modulation control loop ACM, and in which the dynamic of the degressive gain ramp is coordinated with the dynamic characteristics of the adaptive modulation control loop ACM;

the multi-channel reception and processing device is configured to selectively adjust the gain of each of the channels so as to be able to progressively increase the output level of the output signal of an output chain that is to be added to the combination with diversity, and the diversity and handover management device is configured to, upon a unitary handover of antenna from the first satellite to the second satellite and the phase of attachment of the antenna to the destination satellite, order a progressive gain ramp on the chain to be added by the combination device with diversity;

the diversity and handover management device is configured, on detection of an absence of signal on an active chain in the combination, to send a removal command to the combination device with diversity;

the ground station comprises a device for supplying a same source signal to be transmitted at an integer number N, less than or equal to P, of supply terminals, and a transmission and processing device for generating, on N channels, a wave front to a satellite, taken from the first satellite S1 and the second satellite S2, connected as input to the N supply terminals, and having N transmission output terminals connected to N antennas out of the P transmission antennas or equal to P, for delivering in parallel N output processed signals, offset from one another in time and in phase such that the wave fronts of each antenna are aggregated in satellite reception, and a transmission diversity management device configured to control the multi-channel transmission and processing device by determining and sending to it commands for offsetting in time and in phase the N signals transmitted as output of the multi-channel transmission and processing device generated as a function of measurements of calibration of the transmission chains, of estimations of the contributions internal to the terminal in reception and of the contributions linked to the difference in distance between the transmission channels;

the multi-antenna ground station comprises a chain of retroactive calibration of the transmission chains, connected to the input ports of the N antennas in transmission mode through sampling couplers, connecting cables and a chain-selecting N:1 switch, calibrated for the internal contributions of transmission chains of the station in terms of time and phase differential deviations;

the multi-channel transmission and processing device, and the transmission diversity management device are arranged and configured to implement a closed-loop compensation of the time and phase deviations of the N transmission channels of a transmission diversity configuration in which, the N antennas used in transmission diversity on the targeted satellite are at the same time antennas in reception diversity pointing to the same satellite, and send N identical signals offset from one another in time and in phase to generate a coherent wave front at the targeted satellite, and the transmission diversity management device receives a measurement of quality of the aggregation of the carriers transmitted by the N antennas in transmission mode, the measurement of quality of the aggregation of the carriers having been determined in terms of time and phase differences by a receiver of a remote external ground station and retransmitted via a terrestrial return link transmission channel or via a symmetrical return link channel of the targeted satellite, and corrects the time and phase offset setpoints, supplied to the multi-channel transmission and processing device, from the time and phase differences measured by the external ground station;

the N identical signals, offset from one another in time and in phase to generate a coherent wave front at the targeted satellite, are signals of an identical reference sequence, and the differential signals of the receiver of the external ground station are determined by correlation, or the N identical signals, offset from one another in time and in phase to generate a coherent wave front at the targeted satellite, are signals obtained from replicas of a same traffic signal, and the differential signals of the receiver of the external ground station are determined by correlation of the received signal retransmitted by the satellite.

Also a subject of the invention is a method for seamless handover of a communication link in a reception mode or a dual reception/transmission mode from an origin first satellite S1 to a destination second satellite S2. The handover method is implemented by a ground station comprising:

an integer number P, greater than or equal to two, of antennas capable in reception of each tracking, for a same predetermined time period, a satellite taken from an origin first satellite S1 and a destination second satellite S2, both in line of sight during said period, a multi-channel reception and processing device, with P input terminals, connected respectively to P output terminals of the P antennas, to receive as input of said reception and processing device P antenna signals received and supplied at the output of said reception antennas, and to P output terminals to deliver in parallel P output processed signals, aligned with one another in time and in phase, obtained respectively from the P received antenna signals, and a combination device with configurable diversity, connected as input to the multi-channel reception and processing device, to combine some or all of the output processed signals as a function of a setpoint for selecting the output processed signals to be combined, and a device for managing diversity and seamless handover of the communication link.

The communication link handover method is characterized in that the handover of the communication link consists of a succession of a number k, greater than or equal to 2, of seamless and unitary handovers Bi of antennas, selected according to a predetermined sequence, each seamless and unitary antenna handover Bi being a handover of an antenna from a first operational configuration of diversity in reception C1($i$) in which the selected antenna is pointed with tracking to the first satellite S1, to a second operational configuration of diversity in reception C2($i$) in which the selected antenna is pointed with tracking to the second satellite S2, at least one of the first and second configurations C1($i$), C2($i$) of diversity in reception being a configuration in which the diversity in reception is implemented on both first and second satellites S1, S2.

According to particular embodiments, the method for seamless handover of a communication link comprises one or more of the following features:

each seamless and unitary handover Bi comprises steps of control of the multi-channel reception and processing device and the combination device with configurable diversity by determining and sending to them respectively:

satellite acquisition pointing commands, and commands for aligning in time and in phase the P signals received as input of the multi-channel reception and processing device generated as a function of measurements of time and phase deviations of P-1 signals received as input in relation to the signal received as input taken as reference signal, and a setpoint of selection of the output processed signals to be combined as a function of the scheduling of the handover from the first diversity configuration C1 to the second diversity configuration C2 and as a function of measurements of qualities of the signals received as input of the reception and processing device, the control steps being implemented by the device for managing diversity and seamless handover of the communication link.

BRIEF DESCRIPTION OF THE DRAWINGS

The invention will be better understood on reading the following description of a number of embodiments, given purely as an example and with reference to the drawings in which.

DETAILED DESCRIPTION

On satellite telecommunication systems using a constellation of satellites moving on orbits of HEO (High Earth Orbit) or MEO (Medium Earth Orbit) or LEO (Low Earth Orbit) type, fixed or mobile ground stations, forming terminals of the satellite system are used to access one or more of the satellites and exchange with them telecommunication signals carried by one or several carriers.

The ground stations comprise and must use at least two antennas to allow them to implement handovers of communication links from a first, descending origin satellite at the end of line of sight to a second, ascending destination satellite at the start of line of sight, provided that said antennas of the ground stations are directional.

The underlying concept of the invention is to reinforce the use in diversity of the antennas in reception mode and/or in transmission mode during a handover and outside of a handover and to offer the possibility of adding, over time, additional antennas which make it possible to increase the availability and the RF radio performance levels of the ground station and also ensure maintenance of the ground station without affecting the availability of the current service.

The underlying concept of the invention is founded on the exploitation of measurements, performed for example using one of more cross-correlators, of differences of path, undergone by the signals received or transmitted by two or more antennas of the station, these measurements allowing the signals received or to be transmitted to be then realigned in time, in phase and in amplitude and to be later summed coherently. Thus, an improvement of the signal-to-noise ratio of $10 \log(N)$ dB can be achieved, N being the number of antennas involved in the coherent summing or aggregation operation.

Figure 1:
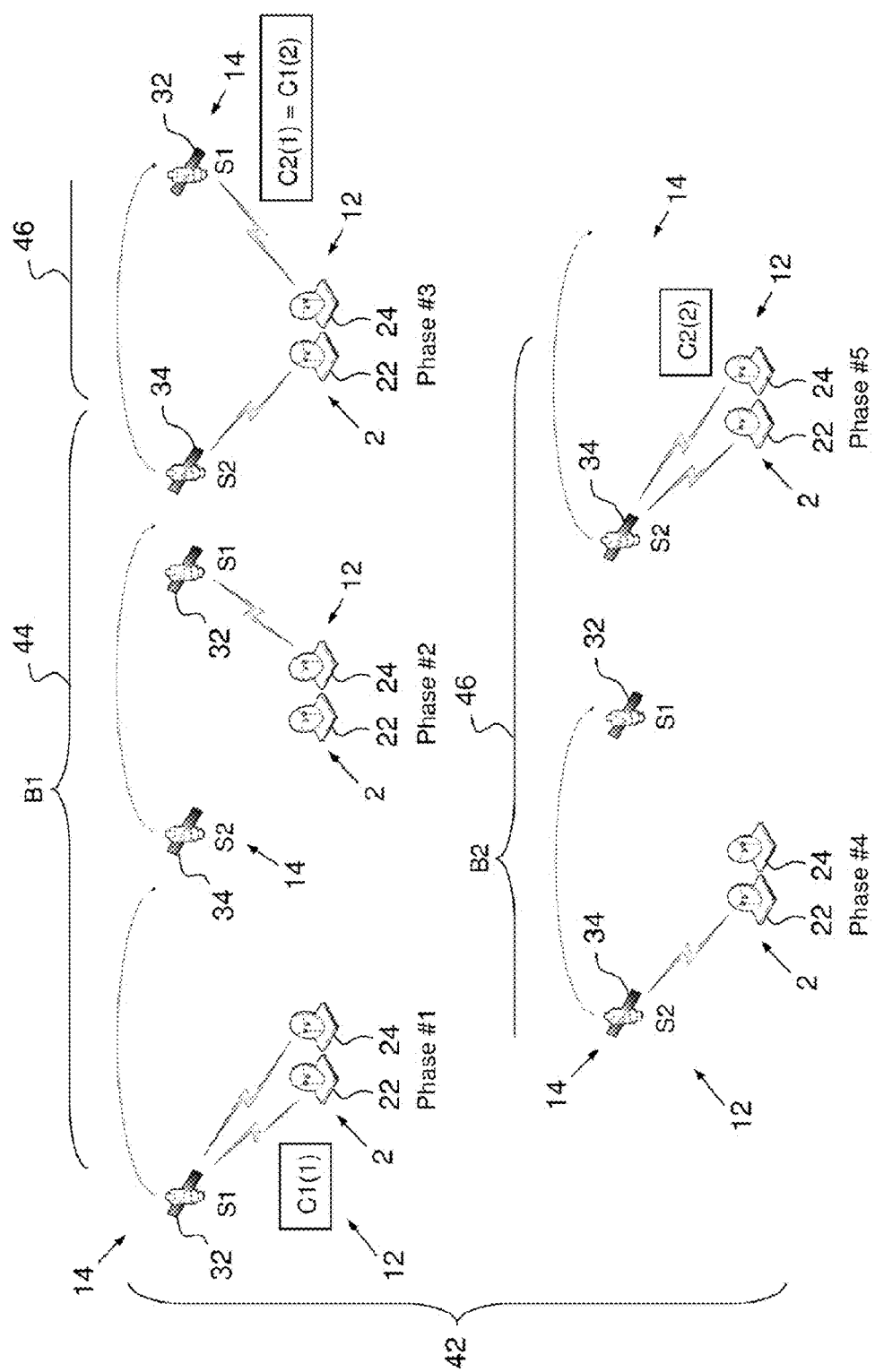
FIG. 1 is a view of the progress of a handover in reception of a communication link from a first satellite S1 to a second satellite S2, implemented by a ground station with two mobile directional antennas according to the invention and according to a first embodiment.

According to FIG. 1 and a first embodiment, a multi-antenna ground station 2 of a satellite telecommunication system 12 using a constellation 14 of moving satellites here comprises two directional and mobile antennas 22, 24, capable in reception of each tracking, for a same predetermined time period, a satellite taken from an origin first satellite 32 S1 and a destination second satellite 34 S2, both in line of sight during said period.

The multi-antenna ground station 2 according to the invention is configured to implement a handover 42 of a communication link from the starting or origin first satellite S1 to the destination second satellite S2.

The handover of the communication link 42 here consists of a succession of two seamless and unitary handovers B1, B2, respectively designated by the references 44, 46, of the antennas 22, 24, selected according to a predetermined sequence, here B1 then B2.

The first seamless and unitary handover 44 B1 is the handover of the first antenna 22 from a first operational configuration of diversity in reception C1(1) in which the first antenna 22 selected for the first handover B1 is pointed with tracking to the first satellite S1 to a second operational configuration of diversity in reception C2(1) in which the first antenna 22 selected is pointed with tracking to the second satellite S2.

The first seamless and unitary handover B1 is broken down into first, second and third phases, executed in succession, respectively designed "phase #1", "phase #2" and "phase #3".

In the first phase "phase #1", the first and second antennas 22, 24 receive from and transmit to the first satellite S1 according to the first diversity configuration C1(1).

During the second phase "phase #2", when the first satellite S1 arrives at the end of travel (i.e. exhibits an elevation relative to the ground station strictly less than 15° typically), the first antenna 22 ceases to transmit to and receive from the first satellite S1 to home in on the second satellite S2 in the third phase "phase #3".

During the third phase "phase #3", the first antenna 22 receives from and transmits to the second satellite S2 while the second antenna 24 receives from and transmits to the first satellite S1, according to the second configuration of diversity in reception C2(1).

The second seamless and unitary handover B2 is the handover of the second antenna 24 from a first operational configuration of diversity in reception C1(2), identical to the second configuration of diversity in reception C2(1) of the first unitary handover B1, in which the second antenna 24 selected for the second unitary handover B2 is pointed with tracking to the first satellite S1, to a second operational configuration of diversity in reception C2(2) in which the first antenna 22 and the second antenna 24 selected are pointed with tracking to the second satellite S2.

The second seamless and unitary handover 46 B2, breaks down into the third phase "phase #3" and fourth and fifth phases, respectively designated "phase #4" and "phase #5", the third, fourth and fifth phases being executed in succession.

During the third phase "phase #3", the first antenna 22 receives from and transmits to the second satellite S2 while the second antenna 24 receives from and transmits to the first satellite S1, according to the first configuration of diversity in reception C2(1) of the second unitary handover.

During the fourth phase "phase #4", at the end of travel of the first moving satellite S1, the second antenna 24 ceases to transmit to and receive from the first satellite S1 to home in on the first antenna, and receive from and transmit to the second satellite S2 in the fifth phase "phase #5".

In the fifth phase, the first and second antennas 22, 24 receive from and transmit to the second satellite S2 according to the second configuration of diversity in reception C2(2) of the second unitary handover.

This process is repeated on each new link handover from a first satellite to a second satellite.

Figure 2:
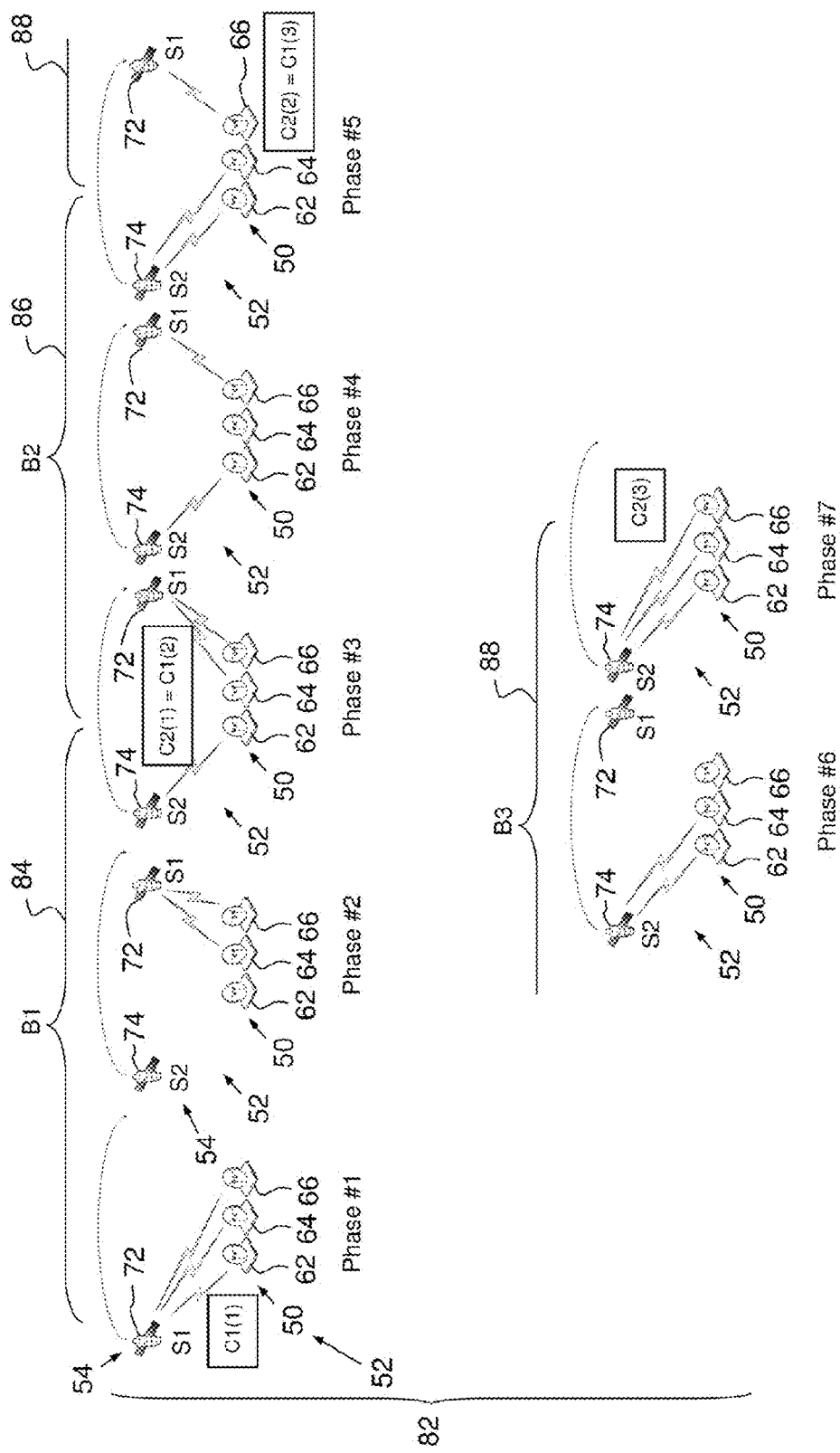
FIG. 2 is a view of the progress of a handover in reception of a communication link from a first satellite S1 to a second satellite S2, implemented by a ground station with three mobile directional antennas according to a second embodiment.

According to FIG. 2 and a second embodiment, a multi-antenna ground station 50 of a satellite telecommunication system 52 using a constellation 54 of moving satellites here comprises three directional and mobile antennas 62, 64, 66, capable in reception of each tracking, for a same predetermined time period, a satellite taken from an origin first satellite 72 S1 and a destination second satellite 74 S2, both in line of sight during said period.

The multi-antenna ground station 50 according to the invention is configured to implement a handover 82 of a communication link from the origin first satellite 72 S1 to the destination second satellite 74 S2.

The handover of the communication link 82 here consists of a succession of three seamless and unitary handovers 84 B1, 86 B2, 88 B3 of the antennas 62, 64, 66 selected in turn, according to a predetermined sequence, here B1 then B2 then B3.

The first seamless and unitary handover 84 B1 is the handover of the first antenna 62 from a first operational configuration of diversity in reception C1(1) in which the first antenna 62 selected for the first handover B1 is pointed with tracking to the first satellite S1, to a second operational configuration of diversity in reception C2(1) in which the first antenna 62 selected is pointed with tracking to the second satellite S2.

The first seamless and unitary handover B1 breaks down into first, second and third phases, executed in succession, designated "phase #1", "phase #2" and "phase #3".

In the first phase "phase #1", the first, second and third antennas 62, 64, 66 receive from and transmit to the first satellite S1 according to the first diversity configuration C1(1).

During the second phase, "phase #2", when the first satellite S1 begins to arrive at end of travel (i.e. exhibits an elevation relative to the ground station strictly less than 15° typically), the first antenna 62 ceases to transmit to and receive from the first satellite S1 to home in on the second satellite S2 in the third phase "phase #3".

During the third phase "phase #3", the first antenna 62 receives from and transmits to the second satellite S2 while the second and third antennas 64, 66 receive from and transmit to the first satellite S1, according to the second configuration of diversity in reception C2(1) of the first unitary seamless handover B1.

The second seamless and unitary handover 86 B2 is the handover of the second antenna 64 from the first operational configuration of diversity in reception C1(2), identical to the second configuration of diversity in reception C2(1) of the first unitary handover B1, in which the second antenna 64 selected for the second unitary handover B2 is pointed with tracking to the first satellite S1, to a second operational configuration of diversity in reception C2(2) with three antennas in which the first antenna 62 and the second antenna 64 selected are pointed with tracking to the second satellite S2 while the third antenna 66 remains pointed with tracking to the first satellite S1.

The second seamless and unitary handover 86 B2 breaks down into the third phase "phase #3" and fourth and fifth phases, respectively designated "phase #4" and "phase #5", the third, fourth and fifth phases being executed in succession.

During the third phase "phase #3" the first antenna 62 receives from and transmits to the second satellite S2 while the second and third antennas 64, 66 receive from and transmit to the first satellite S1, according to the first configuration of diversity in reception C2(1) of the second unitary handover B2.

During the fourth phase "phase #4", the end of travel of the first moving satellite S1, the second antenna 64 ceases to transmit to and receive from the first satellite S1 to home in on the first antenna 62, and receive from and transmit to the second satellite S2 in the fifth phase "phase #5".

In the fifth phase and according to the second configuration of diversity in reception C2(2) with three antennas of the second unitary handover B2, the first and second antennas 62, 64 receive from and transmit to the second satellite S2 while the third antenna 66 receives from and transmits to the second satellite S2.

The third seamless and unitary handover 88 B3 is the handover of the third antenna 66 from a first operational configuration of diversity in reception C1(3), identical to the second configuration of diversity in reception C2(2) of the second unitary handover B2, in which the third antenna 66 selected for the third unitary handover B3 is pointed with tracking to the first satellite S1, to a second operational configuration of diversity in reception C2(3) with three antennas in which the first, second and third antennas 62, 64, 66 are pointed with tracking to the second satellite S2.

The third seamless and unitary handover 88 B3 breaks down into the fifth phase "phase #5" and sixth and seventh phases, respectively designated "phase #6" and "phase #7", the fifth, sixth and seventh phases being executed in succession.

During the fifth phase "phase #5" and according to the first configuration of diversity in reception C1(3) of the third unitary handover B3, the first and second antennas 62, 64 receive from and transmit to the second satellite S2 while the third satellite 66 receives from and transmits to the first satellite S1.

During the sixth phase "phase #6", the end of travel of the first moving satellite S1 still continuing, the third antenna 66 ceases to transmit to and receive from the first satellite S1 to home in on the first and second antennas 62, 64 and receive from and transmit to the second satellite S2 in the seventh phase "phase #7".

In the seventh phase and according to the second configuration of diversity in reception C2(3) with three antennas of the third unitary handover B3, the first, second and third antennas 62, 64, 66 receive from and transmit to the second satellite S2.

Figure 3:
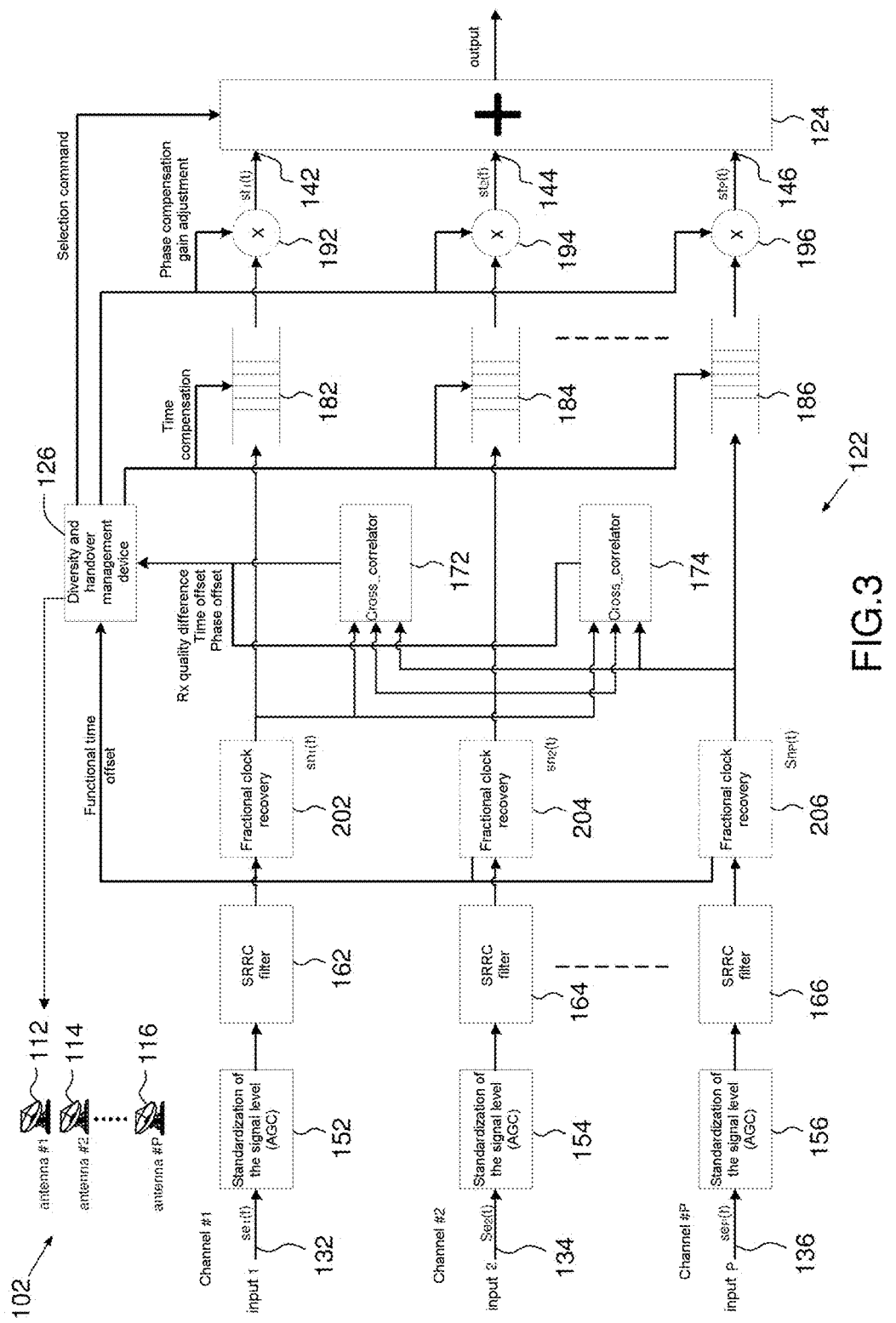
FIG. 3 is a view of a general modular architecture of a multi-antenna ground station concerning the devices of said station and their arrangement which allows the implementation of a seamless handover in reception of a communication link from an origin first satellite S1 to a second satellite S2 with optimization of the use of the diversity in reception, as represented in the examples of FIGS. 1 and 2.

The benefit of using a ground station here having three mobile directional antennas according to the invention and the link handover 82 of FIG. 3 is to permanently guarantee a diversity with two antennas, including in the case where the two satellites S1, S2 send the same carrier. It is always possible to combine at least two antennas of the ground station permanently.

Generally, a multi-antenna ground station of a satellite telecommunication system using a constellation of moving satellites comprises an integer number P, greater than or equal to two, of antennas capable in reception of each tracking, for a same predetermined time period, a satellite taken from an origin first satellite S1 and a destination second satellite S2, both in line of sight during said period.

The multi-antenna ground station according to the invention is configured to implement a handover of a communication link from the origin first satellite S1 to the destination second satellite S2. The handover of the communication link consists of a succession of a number P, greater than or equal to 2, of seamless and unitary handovers Bi (i lying between 1 and P) of antennas, selected according to a predetermined sequence. Each seamless and unitary antenna handover Bi is the handover of an antenna from a first operational configuration of diversity in reception C1(i) in which the selected antenna is pointed with tracking to the first satellite S1, to a second operational configuration of diversity in reception C2(i) in which the selected antenna is pointed with tracking to the second satellite S2, at least one of the first and second configurations C1(i), C2(i) of diversity in reception being a configuration in which the diversity in reception is implemented on both first and second satellites S1, S2.

More particularly, the integer number P of reception antennas, capable of each pointing and tracking, for a same predetermined time period, a satellite taken from a first satellite S1 and a second satellite S2, and of channels of the reception and processing device is greater than or equal to three. The first and second configurations C1(i), C2(i), of diversity in reception of each unitary seamless handover Bi are each configurations in which the diversity in reception is implemented on both first and second satellites S1, S2. During each unitary seamless handover Bi and during the handover of the communication link, a diversity in reception on at least two antennas is permanently assured.

According to FIG. 3 and a preferred embodiment of the invention, a multi-antenna ground station 102 comprises an integer number P, greater than or equal to two, of mobile directional antennas 112 (antenna #1), 114 (antenna #2), 116 (antenna #P), a multi-channel reception and processing device 122, a combination device with configurable diversity 124 and a device 126 for managing diversity and seamless handover of a reception communication link from an origin first satellite S1 to a destination second satellite S2.

The P mobile directional antennas 112, 114, 116 are capable in reception of each tracking, for a same predetermined time period, a satellite taken from an origin first satellite S1 and a destination second satellite S2, both in line of sight during said period.

The multi-channel reception and processing device 122 comprises P input terminals 132, 134, 136, connected respectively to P output terminals of the P antennas 112, 114, 116, to receive as input of said reception and processing device, P received antenna signals se1(t), se2(t), seP(t) and supplied as output of said reception antennas 112, 114, 116. The multi-channel reception and processing device 122 comprises P output terminals 142, 144, 146 to deliver in parallel P output processed signals st1(t), st2(t), stP(t), aligned with one another in time and in phase, obtained respectively from the P received antenna signals se1(t), se2(t), seP(t).

The multi-channel reception and processing device 122 is configured to:

receive, standardize and filter on P distinct and separate channels, numbered by an integer index j varying from 1 to P, the P received antenna signals se1(t), se2(t), seP(t), supplied as output by the P antennas 112, 114, 116, and P standardized and filtered signals, then estimate time deviations, phase deviations and quality deviations between a reference standardized and filtered signal, taken from the P standardized and filtered signals, and the P-1 remaining standardized and filtered signals, and supply said deviations to the diversity and handover management device; then for each channel, apply a time compensation and a phase compensation to the standardized and filtered signal, associated with the channel, from corresponding commands for alignment in time and in phase, generated and sent by the diversity and handover management device.

The multi-channel reception and processing device 122 here comprises, for example:

a battery of P automatic gain control AGC devices 152, 154, 156, for standardizing the signals received as input of the multi-channel reception and processing device, and a battery of P band pass filters 162, 164, 166, for filtering the standardized signals, here SRRC (Square Root Raised Cosine) filters.

The multi-channel reception and processing device 122 here also comprises a battery of P-1 complex cross-correlators 172, 174 for estimating time deviations, phase deviations and quality deviations between a reference standardized and filtered signal, taken from the P standardized and filtered signals, and the P-1 remaining standardized and filtered signals.

The battery of the P-1 complex cross-correlators 172, 174 is configured to supply said deviations to the diversity and handover management device, by seeking for each cross-correlator a correlation peak which makes it possible to deduce the time deviation between the compared signals, by exploiting the argument of the cross-correlated signal to determine the phase deviation between the compared signals, and by exploiting the level of correlation between the compared signals to determine a quality difference indication.

The multi-channel reception and processing device 122 also comprises a battery of P delay lines 182, 184, 186 of FIFO (First In First Out) type with programmable time offset, connected downstream to a battery of P multipliers 192, 194, 196 with programmable phase compensation, the multipliers 192, 194, 196 allowing the phase compensations being connected as input to the combination device with diversity 124.

The multi-channel reception and processing device 122 is configured to selectively adjust the gain of each of the channels so as to be able to progressively selectively attenuate the output level of the signal from the output chain that is to be removed from the combination with diversity.

The combination device 124 with configurable diversity is connected as input to the multi-channel reception and processing device 122, to combine some or all of the output processed signals as a function of a setpoint of selection of the output processed signals to be combined, supplied by the diversity and handover management device 126.

The diversity and seamless handover management device 126 is configured to manage and coordinate the execution of a handover of the communication link from an origin first satellite S1 to a destination second satellite S2. The handover of the communication link consists of a succession of a number K, greater than or equal to 2, of seamless and unitary handovers Bi of antennas, selected according to a predetermined sequence. Each seamless and unitary antenna handover Bi is a handover of a predetermined antenna from a first operational configuration of diversity in reception C1(i) in which the selected antenna is pointed with tracking to the first satellite S1, to a second operational configuration of diversity in reception C2(i) in which the selected antenna is pointed with tracking to the second satellite S2, at least one of the first and second configurations C1(i), C2(i) of diversity in reception being a configuration in which the diversity in reception is implemented on both first and second satellites S1, S2.

The diversity and seamless handover management device 126 is also configured, during each seamless and unitary handover Bi, to control the antennas 112, 114, 116, the multi-channel reception and processing device 122 and the combination device with configurable diversity 124 by determining and sending to them respectively:

satellite acquisition pointing commands, and commands for alignment in time and in phase of the P signals received as input of the multi-channel reception and processing device generated as a function of measurements of time and phase deviations of P-1 signals received as input relative to the signal received as input taken as reference signal, and a setpoint of selection of the output processed signals to be combined as a function of the scheduling of the unitary seamless handovers Bi (i varying from 1 to K) constituting the handover from the first diversity configuration C1(1) to the second diversity configuration C2(K) and as a function of measurements of qualities of the signals received as input of the reception and processing device.

The diversity and seamless handover management device 126 is configured, on detection of an absence of signal on an active chain in the combination, to send a removal command to the combination device with diversity.

The diversity and seamless handover management device 126 is configured, on a handover of antenna from the first satellite to the second satellite, to order a degressive gain ramp on the chain to be removed by the combination device with diversity, and, when the differential quality has passed below a predetermined threshold, order the combination device with diversity to remove said chain.

The multi-antenna ground station 102 according to the invention can comprise a single demodulator, not represented in FIG. 3, connected as output of the combination device with diversity 124.

The multi-antenna ground station 102 according to the invention can, optionally, comprise a device for implementing an adaptive control modulation ACM loop.

When the multi-antenna ground station 102 according to the invention comprises a device for implementing an adaptive control modulation ACM loop, the dynamic range of the degressive gain ramp is coordinated with the dynamic characteristics of the adaptive control modulation ACM loop.

When the ground station according to the invention 102 is in operation, the input signals se1(t), se2(t), seP(t), received from the antennas 112, 114, 116 through possible RF reception chains Rx that can amplify and/or transpose in frequency and/or digitize, are first of all standardized using an AGC on each channel, then filtered by the filters 162, 164, 166 to isolate the signal of interest to be summed on each of the channels.

The standardized signals sn1(t), sn2(t), snP(t) then feed the battery of the P-1 complex cross-correlators which makes it possible both by searching for the correlation peaks to deduce the time difference between the signals, and, through the argument of the cross-correlation signals, measure the phase deviation between the signals.

The signal se1(t) supplied as input 132 of the first channel (channel #1) is taken here to be the reference signal.

In order to limit the operating frequency of each cross-correlator 172, 174, each input signal of said cross-correlators can be passed, optionally, through a fractional clock recovery loop 202, 204, 206 for the fractional delays less than a duration of a digital sample based on an NDA (Non Data-Aided) rate recovery algorithm, for example of Gardner type.

These measurements of time and phase deviation control the delay lines FIFOs 182, 184, 186 with configurable time offset and the multipliers 192, 194, 196 in order to apply the necessary compensations to the signals before finally applying their summing.

The reception quality indication enables the diversity and handover management device 126, when it detects a deviation of said quality between the two signals, to reduce the contribution of the noisiest signal for problems of link budget quality.

What is sought is not an absolute indication of the quality of the signal but rather an indication relating to the quality difference. From this point of view, the level of correlation between the signals constitutes a perfect estimator, all the more so as it requires no a priori knowledge of the signal.

On a link handover decision between a first satellite S1 and a second satellite S2 which can occur and originate either from a member of the satellite system, different from the ground station, or be from the ground station itself, based for example on the exceeding of a minimum elevation threshold, the addition of an antenna by the combination device 124 with configurable diversity is not abruptly interrupted but a progressive gain reduction ramp on the amplitude of the signal originating from the antenna to be removed is applied in order to limit the disturbance of any ACM loop used in the transmission. This ramp is typically of the order of a few tenths of dB per round trip time period RTT. For example, on an MEO satellite and with a typical RTT of 60 ms, this process takes less than a second.

Symmetrically upon the addition of a new signal and therefore of a new antenna in reception, this signal addition must be done progressively in order to avoid a significant level deviation at the input of the automatic gain control AGC device of the corresponding channel of the reception and processing device 122 which, by saturating the AGC device of the demodulator arranged downstream of the combination device 124, could produce a momentary loss of signal inducing a loss of traffic.

Figure 4:
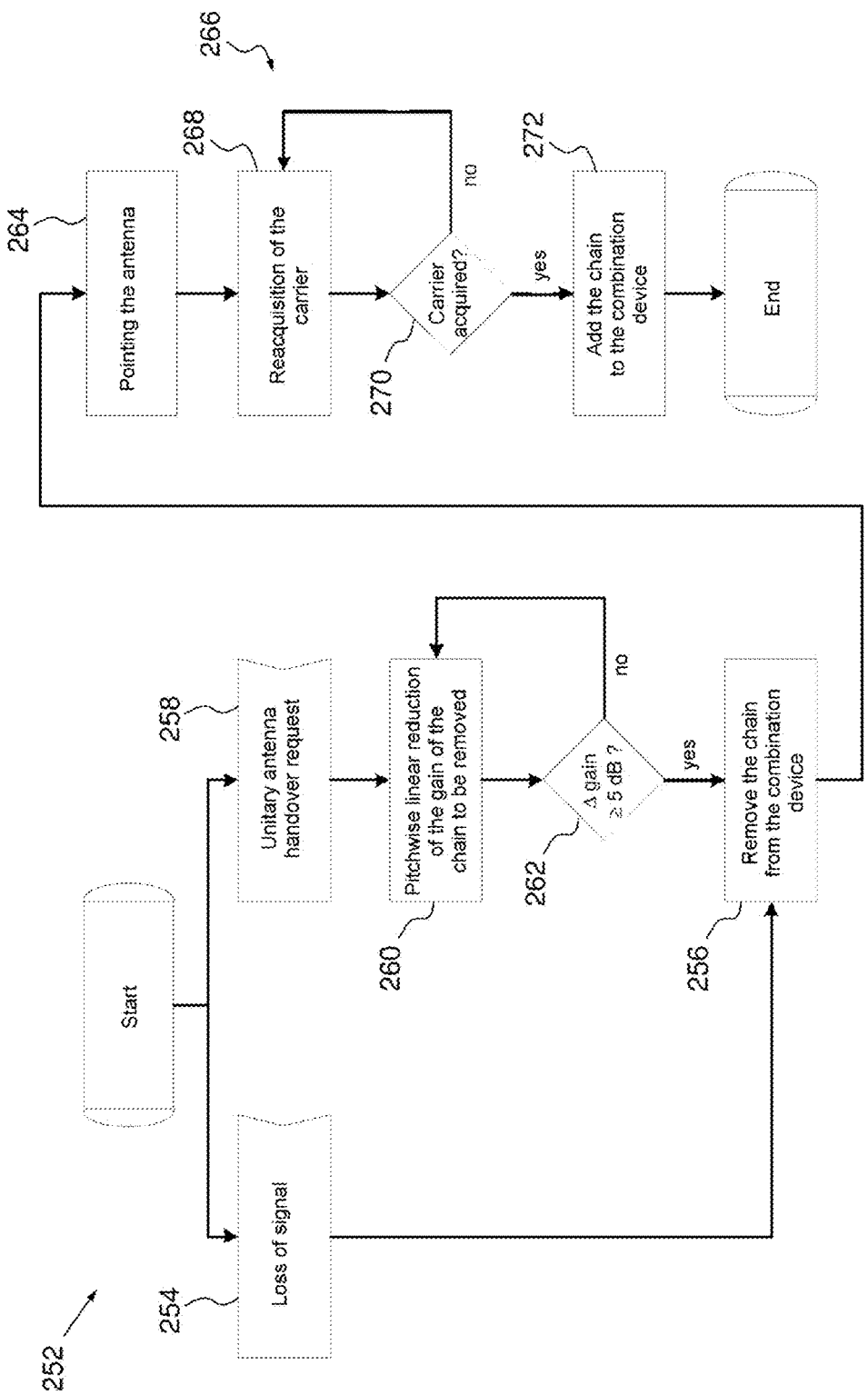
FIG. 4 is a flow diagram of a unitary seamless antenna handover from the origin first satellite S1 to the second satellite S2, the unitary seamless handover being implemented by the multi-antenna ground station according to the invention of FIG. 3, and being a generic step of a succession of unitary seamless handover steps, said succession forming a handover in reception of a communication link from the first satellite S1 to the second satellite S2.

According to FIG. 4, a typical process 252 for managing a unitary seamless handover of an antenna from an origin first satellite S1 to a destination second satellite S2 is illustrated.

When an absence of reception signal on an antenna is detected in a first step 254 because of the fact that the correlation no longer works with a satisfactory level, the suspected associated channel is immediately removed in a second step 256 of the addition performed by the combination device 124 in order to prevent said noisy channel from adding an additional noise.

Following a request for a unitary seamless handover of an antenna in reception mode from a first satellite S1 to a second satellite S2, the execution of this handover is activated in a third step 258, and, in a fourth step 260, a degressive gain ramp is applied to the chain to be removed. In a fifth step 262, the differential quality associated with said chain to be removed is compared to a predetermined threshold value, here assumed equal to 5 dB, and which, in practice, is embodied by a minimum correlation level threshold.

As long as the quality difference does not exceed the threshold value, the linear gain reduction by gain steps continues to be applied with the repetition of the fourth and fifth steps 260, 262.

When the quality difference exceeds 5 dB, the chain to be removed is completely removed from the final summing in the second step 256.

The antenna associated with the removed chain can then be repositioned freely to acquire a new satellite by execution of a pointing of the antenna in a sixth step 264 and a carrier re-acquisition loop 266 (seventh step 268 and eighth step 270). When the acquisition of the carrier, embodied by a sufficient correlation level, is achieved, following a ninth step 272, the channel connected to the antenna and to its RF reception chain is once again included in the final summing process of the combination device with diversity.

Figure 5:
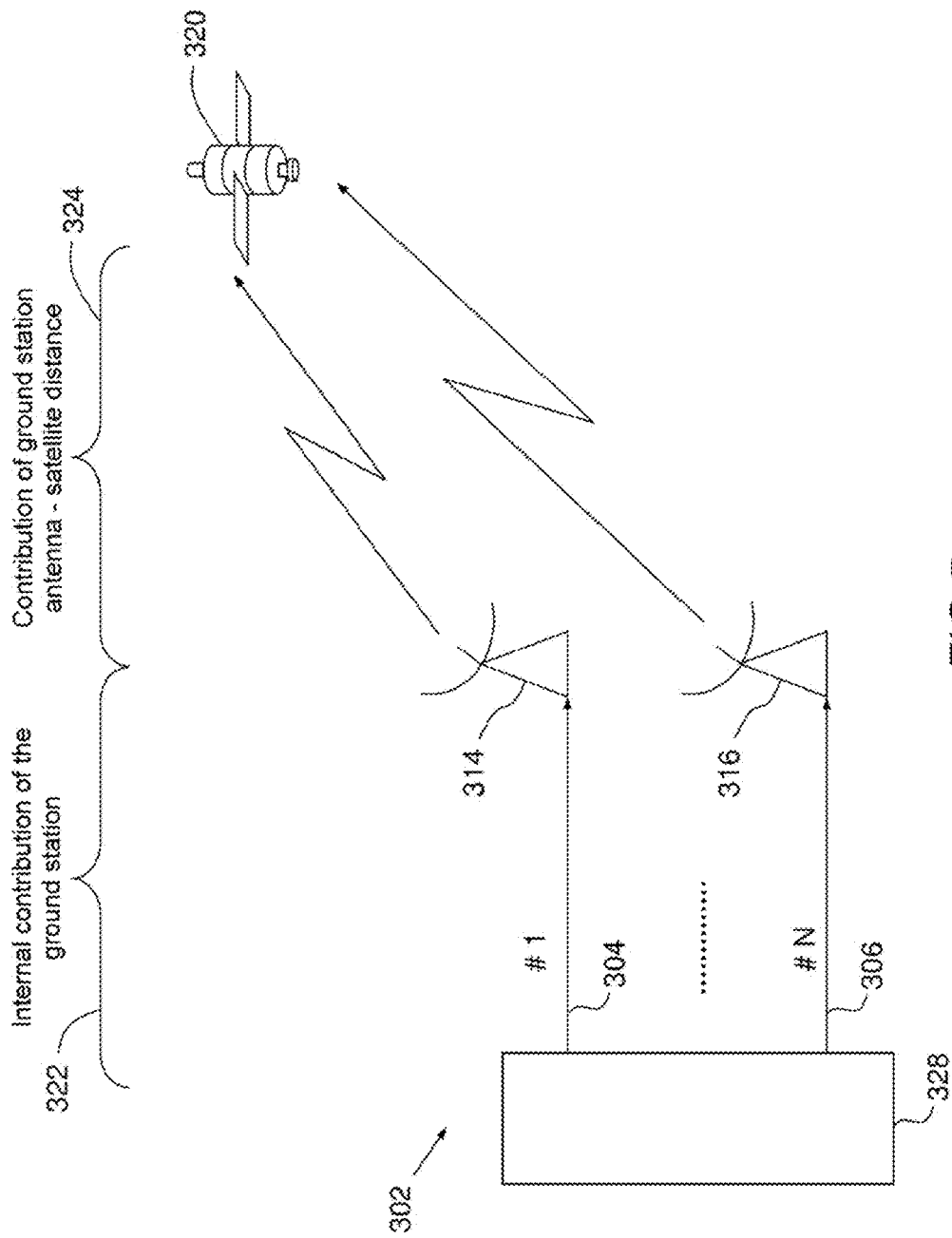
FIG. 5 is a partial view of a communication system in which a ground station according to the invention is limited to simplify the illustration with two transmission channels in transmission diversity and with two mobile directional antennas, operating in transmission mode and pointing with tracking to a same satellite, the partial view making it possible to identify the respective contributions provided by the equipment items of the ground station on each of the channels and by the differentiated geometrical paths between the antennas of the ground station and the targeted satellite with the time and phase offsets from the inputs of the channels to the satellites.

According to FIG. 5, a ground station 302 according to the invention, derived from the ground station 102 described in FIG. 3, further comprises at least two transmission channels 304, 306, capable of being combined, and at least two mobile directional antennas 314, 316, capable of operating in transmission mode and of pointing with tracking to a same satellite 320.

FIG. 5 illustrates the respective contributions 322, 324, provided by the transmission equipment items 328 of the ground station 302 on each of the channels 304, 306, and by the differentiated geometrical paths between the antennas 314, 316 operating in transmission mode of the ground station 302 and the common satellite 320 targeted with the time and phase offsets from the inputs of the channels 304, 306, to the common satellite 320 targeted.

Generally, both for the reception and transmission chains, in their RF and digital components, the contributions are best separated into two parts:

a first part concerning the contribution internal to the terminal originating from the phase of random start up of the local oscillators LO and the delays induced in particular by the length of the cables, a second part concerning the contribution originating from the distance between the antennas and the satellite.

Figure 6:
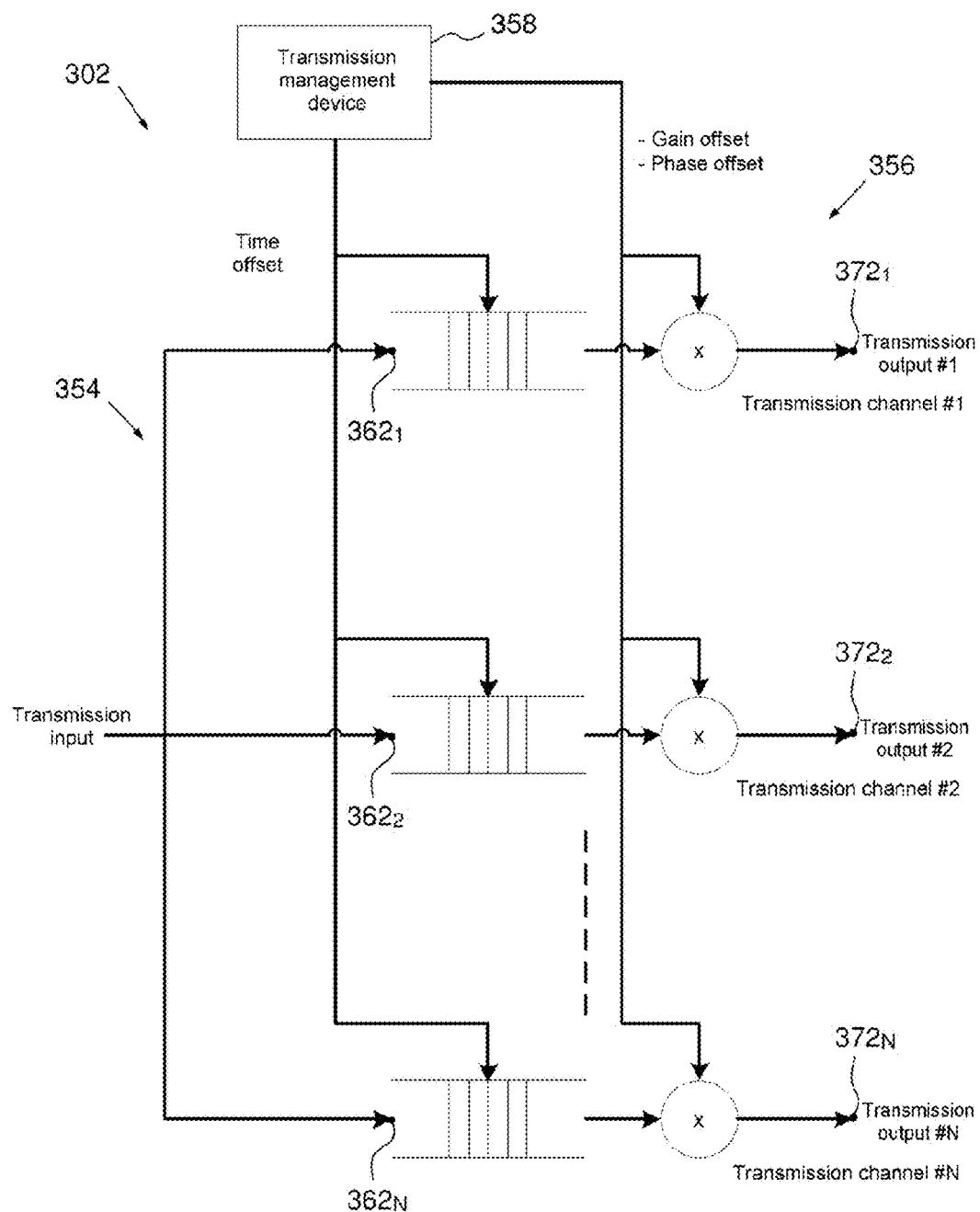
FIG. 6 is a partial view of a modular architecture of a multi-antenna ground station, limited to a multi-channel transmission and processing device with N channels which makes it possible to transmit N carriers at the same frequency by carrying a same communication signal, through N antennas operating in transmission mode and pointed to the same satellite, so as to produce a reception by the targeted satellite of the N carriers aggregated coherently.

According to FIG. 6 and a general modular architecture of the multi-antenna ground station 302, the more specific devices of the transmission mode of the station and their arrangement are illustrated.

These devices are configured to allow the ground station to transmit N carriers at the same frequency carrying a same communication signal, through N antennas operating in transmission mode and pointed to the same satellite, and a reception by the satellite of N carriers aggregated coherently.

According to FIG. 6, the multi-antenna ground station 302 comprises a device 354 for supplying a same feed signal, a transmission and processing device 356 for generating, on N channels, a wave front intended for a same satellite 320, and a device for managing diversity in transmission 358.

The device 354 for supplying a same feed signal to be transmitted is configured to supply the feed signal divided up into an integer number N, less than or equal to P, of supply terminals $362_1$, $362_2$, ..., $362_N$.

The transmission and processing device 356, configures to generate, on N transmission channels, a wave front to the satellite 320, pointed and in reception mode, taken from the first satellite S1 and the second satellite S2, is connected as input to the N supply terminals $362_1$, $362_2$, ..., $362_N$ of the supply device 354.

The transmission and processing device 356 comprises N transmission output terminals $372_1$, $372_2$, ..., $372_N$ connected to N antennas out of the P transmission antennas, to deliver in parallel N output processed signals, offset with one another in time and in phase such that the wave fronts of each antenna are aggregated in reception on the common satellite 320.

The device for managing diversity in transmission 358 is configured to control the multi-channel transmission and processing device 356, by determining and by sending to it commands for offsetting in time and in phase the N signals transmitted as output from the multi-channel transmission and processing device.

The commands for offsetting in time and in phase the N signals transmitted as output from the multi-channel transmission and processing device are generated as a function of measurements of calibration of the transmission chains, of estimations of the contributions internal to the terminal in reception and the contributions linked to the difference in distance between the transmission channels.

Thus, N differentiated transmission channels are created from a same signal, by inserting a different delay at each output and a phase and amplitude correction, which makes it possible to generate a wave front to the common satellite, the recipient in transmission mode, the wave front being composed of the wave fronts of each antenna which are aggregated constructively at the point of antenna reception of the common satellite.

Figure 7:
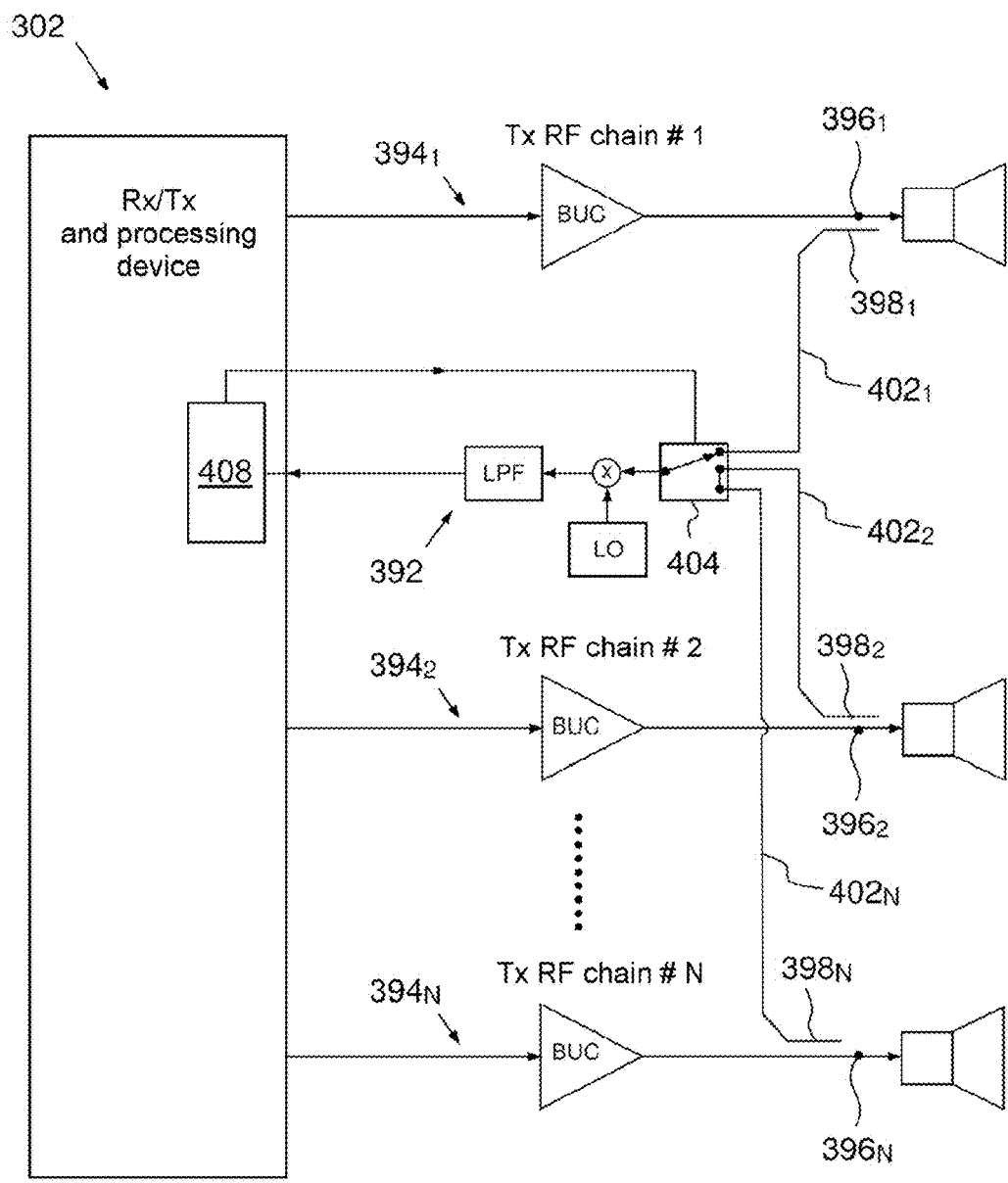
FIG. 7 is a view of an RF transmission chain calibration system, connected between the outputs of N transmission channels of the multi-channel transmission and processing device and the associated antennas in transmission mode.

According to FIG. 7, the multi-channel ground station 302 of FIGS. 5 and 6 comprises a retroactive calibration chain 392 of the transmission Tx RF chains $394_1$, $394_2$, ..., $394_N$.

The retroactive calibration chain 392 of the transmission RF chains is connected to the input ports $396_1$, $396_2$, ..., $396_N$ of the N antennas in transmission mode through N sampling couplers $398_1$, $398_2$, ..., $398_N$, connecting cables $402_1$, $402_2$, ..., $402_N$ and a transmission RF chain selection N:1 switch 404.

The sampling couplers $398_1$, $398_2$, ..., $398_N$, the connecting cables $402_1$, $402_2$, ..., $402_N$ and the N:1 switch 404 are calibrated to allow an estimator 408 of the internal contributions of transmission RF chains to determine the internal contributions of the transmission chains of the ground station in terms of time and phase differential deviations. These estimations are performed from measurements of calibration of the transmission RF chains returned by the retroactive calibration chain 392.

The retroactive calibration chain 392 thus makes it possible to measure the phase deviation and the differential delay between two transmission RF chains selected by choice through a sequence of appropriate commands sent by the estimator 408 to the switch 404.

The contributions internal to the ground station 302 in transmission in terms of phase and time deviations, respectively designated $\Delta\varphi_{TX\_ter}$ and $\Delta t_{TX\_ter}$, are thus estimated using the retroactive calibration chain 392. These two values are deduced by the sending of a reference signal over each transmission RF chain $394_1$, $394_2$, ..., $394_N$ and an estimation of the phase-shift and of the delay, the estimation using, for example, the same type of estimation device as that preferred based on a correlator for the reception mode of the antennas.

Thus, the phase differences of the local oscillators LO of the RF transmission chains can be taken into account to determine the setpoint deviations of the transmission channels in order to obtain a coherent aggregation on the receiving satellite of the wave fronts transmitted by the antennas in transmission mode.

It should be noted that this retroactive calibration chain 392 be re-used for an adaptive pre-distortion function of the amplification and frequency conversion BUC (Block Up-Converter) units of the transmission RF chains in as much as this chain 392 makes it possible to sample the signal at the output of the amplification chain.

Concerning the estimation of the contribution originating from the differences in the distances between the antennas and the targeted receiving common satellite, the antennas 314, 316, operating in transmission mode to said common satellite are assumed to operate also in reception mode with respect to the same common satellite.

For this estimation of the second part of the contributions the phase measurements of the Rx reception chains cannot be re-used as such. In effect, any two RF reception chains, taken from all of the reception Rx RF chains, being independent, even if these two Rx RF chains have a same clock reference, the absolute phase cannot be controlled. It is therefore essential to start again from the half difference given by the time offset of the signals received by the antennas. The phase part is, for its part, both effected by the relative phase difference between the local oscillators LO of the two RF chains and by difference in paths of the wave front, i.e. the difference in the two corresponding received paths.

The internal contributions of the ground station in reception and in terms of phase and time deviations being respectively designated by $\Delta\varphi_{RX\_ter}$ and $\Delta t_{RX\_ter}$ and the contributions linked to the differences in distances between the two antennas and the satellite on the go down channel being respectively designated by $\Delta\varphi_{sat-ter}$ and $\Delta t_{sat-ter}$, a first relationship $$\Delta\varphi_{RX\_ter} = \Delta t_{RX\_ter} \cdot c + \Delta\varphi_{RX\_LOs}$$

is satisfied in which $\Delta\varphi_{RX\_LOs}$ designates the internal phase difference between the local oscillators LO of the two reception chains and c designates the speed of light in vacuum.

To estimate the time deviation $\Delta t_{RX\_ter}$, one method is, for example, to use low-noise amplification units LNB (Low Noise Blocks) that are as close as possible or calibrated, and calibrated cable lengths.

It should be noted that, in the case where the acquisition chain in reception is incorporated in the low noise amplification unit LNB and the signal leaves digitized, there is no longer any contribution from the cable.

The time deviation measurements performed on reception being designated by $\Delta t_{RX\_mes}$ and the contributions linked to the difference in distance between the antennas and the satellite on the return channel from the antennas in terms of phase and time deviations being respectively designated by $\Delta\varphi_{ter-sat}$ and $\Delta t_{ter-sat}$, the phase and time estimations used for compensation for the path from the antenna to the satellite in transmission can then be estimated according to the expression:

$$\Delta t_{ter-sat} = \Delta t_{RX\_ter} - \Delta t_{RX\_mes} \text{ and } \Delta\varphi_{ter-sat} = \Delta t_{ter-sat} \cdot c$$

In this approach, the past measurement of the time difference is used to predict that of the transmission. If seeking to improve the quality of these predictions, an approach of autoregressive type can be used, this approach being based for example on a slide GARCH (Generalized AutoRegressive Conditional Heteroscedasticity) algorithm, or on a Kalman filtering or even on ephemerides.

The simplified compensation on transmission is then calculated as follows:

$$\Delta t_{TX\_comp} = -\Delta t_{RX\_ter} - \Delta t_{ter-sat} \text{ and } \Delta\varphi_{TX\_comp} = -\Delta\varphi_{RX\_ter} - \Delta\varphi_{ter-sat}$$

Figure 8:
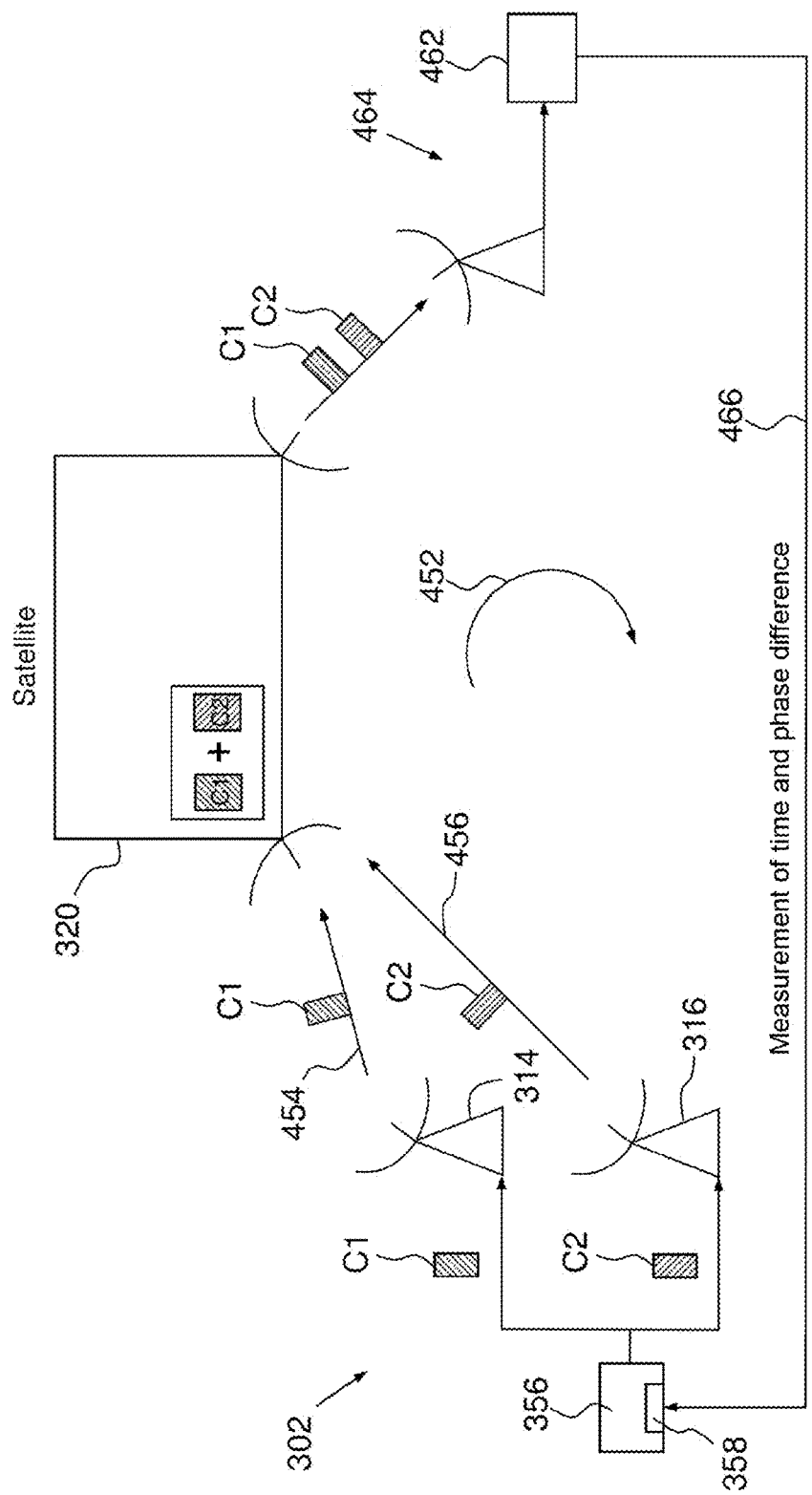
FIG. 8 is a view of an example of a system for closed-loop compensation of the time and phase offsets applied to the signals of the N transmission channels of the transmission and processing device of the ground station, the compensation system using a reference sequence or message.

According to FIG. 8, the multi-channel transmission and processing device 356, and the device for managing diversity in transmission 358 are arranged and configured to implement a closed-loop compensation 452 of the time and phase deviations of the N transmission channels of a transmission diversity configuration. Here, in FIG. 8, in the interests of simplifying the illustration, a limited scheme with two transmission channels and two antennas 314, 316 is provided. This scheme can easily be extended to a number N of antennas and of transmission channels greater than or equal to 3.

The N antennas used in transmission diversity on the targeted satellite 320, here the two antennas 314, 316, are at the same time antennas in reception diversity pointing to the same satellite 320, and sending N identical signals, here two signals in FIG. 8, offset from one another in time and in phase to generate a coherent wave front on the targeted satellite.

The device for managing diversity in transmission 358 receives a measurement of quality of the aggregation of the carriers transmitted by the N antennas in transmission mode 314, 316.

This measurement of quality of the aggregation of the carriers has been performed and determined previously in terms of time and phase differences by a receiver 462 of a remote external ground station 464 and retransmitted to the transmission ground station 302 via a terrestrial return transmission channel 466. The transmission ground station 302 corrects, through the device for managing diversity in transmission 358, the setpoints of time and phase offset, supplied to the multi-channel transmission and processing device 356, from time and phase differences measured by the external ground station 464.

As a variant, the satellite system is bidirectional and comprises a return link via the same targeted satellite. In this case, the measurement of quality of the aggregation of the carriers, determined beforehand in terms of time and phase differences by the receiver of the remote external ground station, is retransmitted via the symmetrical return link channel of the targeted satellite.

This closed loop compensation configuration makes it possible to test the quality of the compensation and possibly correct it by applying to it one or more corrections in order to permanently guarantee a required quality level.

According to FIG. 8 and a first embodiment, the N identical signals, here the two signals 454, 456, offset from one another in time and in phase to generate a coherent wave front on the targeted satellite, are signals of a reference identical sequence but with different frequencies, and the differential signals of the receiver 462 of the external ground station 464 are determined by correlation.

The external receiver 462 of the external ground station 464 receives, here, the two signals at different carrier frequencies. By performing a correlation between these two signals, the external receiver 464 is able to determine a difference in terms of time of arrival and phase deviation, and then supply it to the ground station 302 in transmission mode via the retroaction return channel 466 of the compensation loop 452.

The device for managing diversity in transmission 358 of the ground station according to the invention is configured to compare this result to the offset setpoints used to deduce from the comparison a correction to be made to the future offset setpoints.

As a variant and according to a second embodiment, the N identical signals, offset from one another in time and in phase to generate a coherent wave front on the targeted satellite, are signals obtained from replicas of a same traffic signal, and the differential signals of the receiver of the external ground station are determined by correlation of the received signal retransmitted by the satellite.

This second method fulfils the same objective as the first method of FIG. 8, without requiring a disengagement of the aggregation of the carriers transmitted in traffic mode in order to perform the measurement or measurements required by the compensation loop.

If the measurement of self-correlation of the received signal which is the result of the aggregate of the signals originating from the different antennas is applied, the time and phase compensation fault provokes a reduction of the correlation peak and the appearance of secondary peaks.

This peak deviation corresponds to twice the delay between the signals and the phase of the self-correlation signal and indicates the phase deviation between the compared signals.

The dynamic calibration system and method are designed to be activated and operate by choice permanently, repeated periodically or a-periodically, or on demand through the sending of remote controls from the ground for example.

Advantageously, the multi-antenna ground station according to the invention makes it possible to coherently add multiple received replicas of a same signal, a restoration of coherence of the replicas being performed from the use of measurements of time and phase deviations between channels. The measurements of the time and phase deviations between channels are performed preferably by cross-correlators. The coherent aggregation of two carriers makes it possible to reach up to 3 dB on the signal-to-noise ratio and, generally, the coherent aggregation of N received carriers makes it possible to achieve 10 log(N) dB of improvement in the signal-to-noise ratio.

Advantageously, the architecture and the configuration of the ground station according to the invention allow a harmonious integrated management of an inter-satellite link handover and of an ACM control mechanism by a progressive cutting of a carrier associated with an antenna in its removal from a satellite during the handover and by the capacity to align carriers from a same satellite and/or from two different satellites.

Advantageously, the multi-antenna ground station according to the invention makes it possible to make a wave front in transmission coherent for a reception by a same satellite of several replicas of a same satellite. The coherent aggregation of two transmitted carriers makes it possible to achieve up to 6 dB of transmitted radiated power gain at the location of the satellite and, generally, the coherent aggregation of N transmitted carriers makes it possible to achieve 20 log(N) dB of transmitted radiated power gain at the location of the satellite.

The invention allows for the coherent addition of several replicas of a same signal whether or not the latter originates from a same satellite, whether or not with the same frequency/polarization, by virtue of the realignment in phase/frequency and time of the different replicas on the basis of a band of cross-correlators.

The measurement of path difference on reception, associated with a knowledge of the ephemerides of the satellites is used to generate a prediction of the phase and time offset to be applied on transmission in order to transmit a coherent wave front between the antennas.

The invention also allows for the management of the handover by virtue of the signal quality measurements supplied by the cross-correlators and the ephemerides information. The use of a link break procedure before the implementation of the handover makes it possible to arrange the adaptive loops (ACM) both in transmission and reception.

The invention claimed is:

1. A multi-antenna ground station of a satellite telecommunications system using a constellation of moving satellites,
the ground station comprising:
an integer number P, greater than or equal to two, of antennas capable in reception of each tracking, for a same predetermined time period, a satellite taken from an origin first satellite S1 and a destination second satellite S2, both in line of sight during said period,
a multi-channel reception and processing device, with P input terminals, connected respectively to P output terminals of the P antennas, to receive as input of said reception and processing device P antenna signals received and supplied as output of said reception antennas, and to P output terminals to deliver in parallel P output processed signals, aligned with one another in time and in phase, obtained respectively from the P antenna signals received, and
a combination device with configurable diversity, connected as the input to the multi-channel reception and processing device, to combine some or all of the output processed signals as a function of a setpoint of selection of the output processed signals to be combined, and
a device for managing diversity and seamless handover of a reception communication link from the origin first satellite S1 to the destination second satellite S2,
the ground station wherein
the diversity and seamless handover management device is configured to:
manage and coordinate the execution of a handover of the communication link from the origin first satellite S1 to the destination second satellite S2, said handover of the communication link consisting of a succession of a number k, greater than or equal to 2, of seamless and unitary handovers Bi of antennas, selected according to a predetermined sequence, each seamless and unitary antenna handover Bi being a handover of an antenna from a first operational configuration of diversity in reception C1($i$) in which the selected antenna is pointed with tracking to the first satellite S1, to a second operational configuration of diversity in reception C2($i$) in which the selected antenna is pointed with tracking to the second satellite S2, at least one of the first and second configurations C1($i$), C2($i$) of diversity in reception being a configuration in which the diversity in reception is implemented on both the first and second satellites S1, S2, and
during each seamless and unitary handover Bi, controlling the antennas, the multi-channel reception and processing device and the combination device with configurable diversity by determining and sending to them respectively:
satellite acquisition pointing commands, and
commands for aligning in time and in phase the P signals received as input of the multi-channel reception and processing device generated as a function of measurements of time and phase deviations of P-1 signals received as input in relation to the signal received as input taken as reference signal, and
a setpoint for selecting the output processed signals to be combined as a function of the scheduling of the handover from the first diversity configuration C1(*i*) to the second diversity configuration C2(*i*) and as a function of measurements of qualities of the signals received as input of the reception and processing device.

2. The multi-antenna ground station according to claim 1, wherein the integer number P of reception antennas, each capable of pointing and tracking, for a same predetermined time period, a satellite taken from a first satellite S1 and a second satellite S2, and of channels of the reception and processing device is greater than or equal to three, and preferably equal to three, and the first and second configurations C1(*i*), C2(*i*) of diversity in reception of each unitary seamless handover Bi are each configurations in which the diversity in reception is implemented on both first and second satellites S1, S2, and during each unitary seamless handover Bi and during the handover of the communication link, a diversity in reception on at least two antennas is permanently assured.

3. The multi-antenna ground station according to claim 1, wherein the multi-channel reception and processing device is configured to:
receive, standardize and filter, on P distinct and separate channels, the P received antenna signals supplied as output by the P antennas, into P standardized and filtered signals, then
estimate time deviations, phase deviations and quality deviations between a reference standardized and filtered signal, taken from the P standardized and filtered signals, and the P-1 remaining standardized and filtered signals, and supply said deviations to the diversity and handover management device; then
for each channel, apply a time compensation and a phase compensation to the filtered signal associated with the channel from the corresponding time and phase alignment commands, generated and sent by the diversity and handover management device.

4. The multi-antenna ground station according to claim 1, wherein the multi-channel reception and processing device further comprises:
a battery of P automatic gain control AGC devices for standardizing the signals received as input of the multi-channel reception and processing device, and
a battery of P band pass filters for filtering the standardized signals, for example SRRC filters.

5. The multi-antenna ground station according to claim 1, wherein the multi-channel reception and processing device further comprises:
a battery of P-1 complex cross-correlators for estimating time deviations, phase deviations and quality deviations between a reference standardized and filtered signal, taken from the P standardized and filtered signals, and the P-1 remaining standardized and filtered signals, and supplying said deviations to the management and handover device, by seeking, for each cross-correlator, a correlation peak which makes it possible to deduce the time deviation between the compared signals, by exploiting the argument of the cross-correlated signal to determine the phase deviation between the compared signals, and by exploiting the level of correlation between the compared signals to determine a quality difference indication.

6. The multi-antenna ground station according to claim 1, wherein the multi-channel reception and processing device further comprises:
a battery of P delay lines FIFOs with programmable time offset, connected downstream to a battery of multipliers with programmable phase compensation, the multipliers allowing the phase compensations being connected as input to the combination device with diversity.

7. The multi-antenna ground station according to claim 1, wherein the multi-channel reception and processing device is configured to selectively adjust the gain of each of the channels so as to be able to progressively attenuate the output level of the output signal in a search for an output chain that is to be removed from the combination with diversity, and the diversity and handover management device is configured, upon a handover of antenna from the first satellite to the second satellite; to:

order a degressive gain ramp on the chain to be removed by the combination device with diversity, and when the differential quality has exceeded a predetermined threshold, order the combination device with diversity to remove said chain.

8. The multi-antenna ground station according to claim 7, comprising a demodulator connected at the output of the combination device with diversity and a device for implementing an adaptive modulation control loop ACM, and wherein the dynamic of the degressive gain ramp is coordinated with the dynamic characteristics of the adaptive modulation control loop ACM.

9. The multi-antenna ground station according to claim 1, wherein the multi-channel reception and processing device is configured to selectively adjust the gain of each of the channels so as to be able to progressively increase the output level of the output signal of an output chain that is to be added to the combination with diversity, and the diversity and handover management device is configured to, upon a unitary handover of antenna from the first satellite to the second satellite and the phase of attachment of the antenna to the destination satellite, order a progressive gain ramp on the chain to be added by the combination device with diversity.

10. The multi-antenna ground station according to claim 1, wherein the diversity and handover management device is configured, on detection of an absence of signal on an active chain in the combination, to send a removal command to the combination device with diversity.

11. The multi-antenna ground station according to claim 1, comprising a device for supplying a same source signal to be transmitted at an integer number N, less than or equal to P, of supply terminals, and a transmission and processing device for generating, on N channels, a wave front to a satellite, taken from the first satellite S1 and the second satellite S2, connected as input to the N supply terminals, and having N transmission output terminals connected to N antennas out of the P transmission antennas or equal to P, for delivering in parallel N output processed signals, offset from one another in time and in phase such that the wave fronts of each antenna are aggregated in satellite reception, and a transmission diversity management device configured to control the multi-channel transmission and processing device by determining and sending to it commands for offseting in time and in phase the N signals transmitted as output from the multi-channel transmission and processing device generated as a function of measurements of calibration of the transmission chains, of estimations of the contributions internal to the terminal in reception and of the contributions linked to the difference in distance between the transmission channels.

12. The multi-antenna ground station according to claim 11, comprising a chain of retroactive calibration of the transmission chains connected to the input ports of the N antennas in transmission mode through sampling couplers, connecting cables and a chain-selecting N:1 switch, calibrated for the internal contributions of transmission chains of the station in terms of time and phase differential deviations.

13. The multi-antenna ground station according to claim 11, wherein the multi-channel transmission and processing device, and the transmission diversity management device are arranged and configured to implement a closed-loop compensation of the time and phase deviations of the N transmission channels of a transmission diversity configuration in which
the N antennas used in transmission diversity on the targeted satellite are at the same time antennas in reception diversity pointing to the same satellite, and send N identical signals offset from one another in time and in phase to generate a coherent wave front at the targeted satellite, and
the transmission diversity management device receives a measurement of quality of the aggregation of the carriers transmitted by the N antennas in transmission mode, the measurement of quality of the aggregation of the carriers having been determined in terms of time and phase differences by a receiver of a remote external ground station and retransmitted via a terrestrial return link transmission channel or via a symmetrical return link channel of the targeted satellite, and corrects the time and phase offset setpoints, supplied to the multi-channel transmission and processing device, from the time and phase differences measured by the external ground station.

14. The multi-antenna ground station according to claim 13, wherein
the N identical signals, offset from one another in time and in phase to generate a coherent wave front at the targeted satellite, are signals of an identical reference sequence, and the differential signals of the receiver of the external ground station are determined by correlation, or
the N identical signals, offset from one another in time and in phase to generate a coherent wave front at the targeted satellite, are signals obtained from replicas of a same traffic signal, and the differential signals of the receiver of the external ground station are determined by correlation of the received signal retransmitted by the satellite.

15. A method for seamless handover of a communication link in a reception mode or a dual reception/transmission mode from an origin first satellite S1 to a destination second satellite S2,
the handover method being implemented by a ground station comprising:
an integer number P, greater than or equal to two, of antennas capable in reception of each tracking, for same predetermined time period, a satellite taken from an origin first satellite S1 and a destination second satellite S2, both in line of sight during said period,
a multi-channel reception and processing device, with P input terminals, connected respectively to P output terminals of the P antennas, to receive as input of said reception and processing device P antenna signals received and supplied at the output of said reception antennas, and to P output terminals to deliver in parallel P output processed signals, aligned with one another in time and in phase, obtained respectively from the P received antenna signals, and
a combination device with configurable diversity, connected as input to the multi-channel reception and processing device, to combine some or all of the output processed signals as a function of a setpoint for selection of the output processed signals to be combined, and
a device for managing diversity and seamless handover of the communication link,
the communication link handover method wherein
the handover of the communication link consists of a succession of a number k, greater than or equal to 2, of seamless and unitary handovers Bi of antennas, selected according to a predetermined sequence,
each seamless and unitary antenna handover Bi being a handover of an antenna from a first operational configuration of diversity in reception $C1(i)$ in which the selected antenna is pointed with tracking to the first satellite S1, to a second operational configuration of diversity in reception $C2(i)$ in which the selected antenna is pointed with tracking to the second satellite S2, at least one of the first and second configurations $C1(i)$, $C2(i)$ of diversity in reception being a configuration in which the diversity in reception is implemented on both first and second satellites S1, S2.

16. The method for seamless handover of a communication link according to claim 15, wherein each seamless and unitary handover Bi comprises steps of control of the multi-channel reception and processing device and the combination device with configurable diversity by determining and sending to them respectively:
satellite acquisition pointing commands, and
commands for aligning in time and in phase the P signals received as input of the multi-channel reception and processing device generated as a function of measurements of time and phase deviations of P-1 signals received as input in relation to the signal received as input taken as reference signal, and
a setpoint of selection of output processed signals to be combined as a function of the scheduling of the handover from the first diversity configuration C1 to the second diversity configuration C2 and as a function of measurements of qualities of the signals received as input of the reception and processing device,
the control steps being implemented by the device for managing diversity and seamless handover of the communication link.

* * * * *